(12) United States Patent
Hong et al.

(10) Patent No.: US 8,691,408 B2
(45) Date of Patent: Apr. 8, 2014

(54) SECONDARY BATTERY INCLUDING PROTECTIVE CIRCUIT MODULE TO PROTECT BATTERY WHEN SWELLING OCCURS

(75) Inventors: Eui-Sun Hong, Cheonan-si (KR); Yoon-Tai Kwak, Cheonan-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 2060 days.

(21) Appl. No.: 11/211,134

(22) Filed: Aug. 25, 2005

(65) Prior Publication Data

US 2006/0093896 A1    May 4, 2006

(30) Foreign Application Priority Data

Oct. 28, 2004 (KR) .................. 10-2004-0086897

(51) Int. Cl.
| | |
|---|---|
| *H01M 10/02* | (2006.01) |
| *H01M 10/48* | (2006.01) |
| *H01M 2/02* | (2006.01) |
| *H01M 2/34* | (2006.01) |
| *H01M 10/42* | (2006.01) |

(52) U.S. Cl.
CPC ............ *H01M 2/345* (2013.01); *H01M 10/425* (2013.01)
USPC ................................. 429/61; 429/90; 429/176

(58) Field of Classification Search
None
See application file for complete search history.

(56) References Cited

U.S. PATENT DOCUMENTS

| | | | | |
|---|---|---|---|---|
| 3,305,816 | A | * | 2/1967 | Doi .................................. 338/2 |
| 3,656,340 | A | * | 4/1972 | Ball ................................. 429/90 |
| 3,997,229 | A | * | 12/1976 | Narozny et al. ............... 439/492 |
| 6,617,069 | B1 | * | 9/2003 | Hopper et al. ................. 429/61 |
| 7,244,527 | B2 | * | 7/2007 | Klein ............................. 429/122 |
| 2003/0008208 | A1 | * | 1/2003 | Yamazaki .................... 429/158 |
| 2005/0181272 | A1 | * | 8/2005 | Kim ................................ 429/56 |

FOREIGN PATENT DOCUMENTS

| | | | |
|---|---|---|---|
| JP | 58034577 | A | 3/1983 |
| JP | 60212974 | A | 10/1985 |
| JP | 04079732 | A | 3/1992 |
| JP | 05152000 | A | 6/1993 |
| JP | 5-326027 | | 12/1993 |
| JP | 06052901 | A | 2/1994 |
| JP | 08316495 | A | 11/1996 |
| JP | 10092476 | A | 4/1998 |
| JP | 2000285905 | A * | 10/2000 ............. H01M 2/34 |
| JP | 2000340264 | A | 12/2000 |

(Continued)

OTHER PUBLICATIONS

Derwent Abstract for Kim, KR 2003-044510 A.*

(Continued)

*Primary Examiner* — Edu E Enin-Okut
(74) *Attorney, Agent, or Firm* — Robert E. Bushnell, Esq.

(57) ABSTRACT

A secondary battery includes a case having positive and negative electrodes, a safety device attached to a surface of the case and having a resistance value which changes during swelling of the case, and a protective circuit module attached to a side of the case while being electrically connected to the safety device. The resistance value of the safety device changes as the case swells, and the protective circuit module reduces or interrupts charging/discharging currents in response thereto. The safety device can be used for all secondary batteries regardless of capacity, can quickly react against abruptly rising internal temperature and rapid swelling, and can stably prevent swelling which occurs above an allowable temperature.

25 Claims, 14 Drawing Sheets

(56) References Cited

FOREIGN PATENT DOCUMENTS

| | | | | |
|---|---|---|---|---|
| JP | 2003077434 A | | 3/2003 | |
| JP | 2003162987 A | | 6/2003 | |
| KR | 2000051638 A | * | 8/2000 | ............ H01M 10/02 |
| KR | 1020000051638 A | | 8/2000 | |
| KR | 2003044510 A | * | 6/2003 | ............. H01M 2/34 |

OTHER PUBLICATIONS

Chinese Examination Report corresponding to Chinese Patent Application No. 2005101183195, issued on Jul. 20, 2007.

* cited by examiner

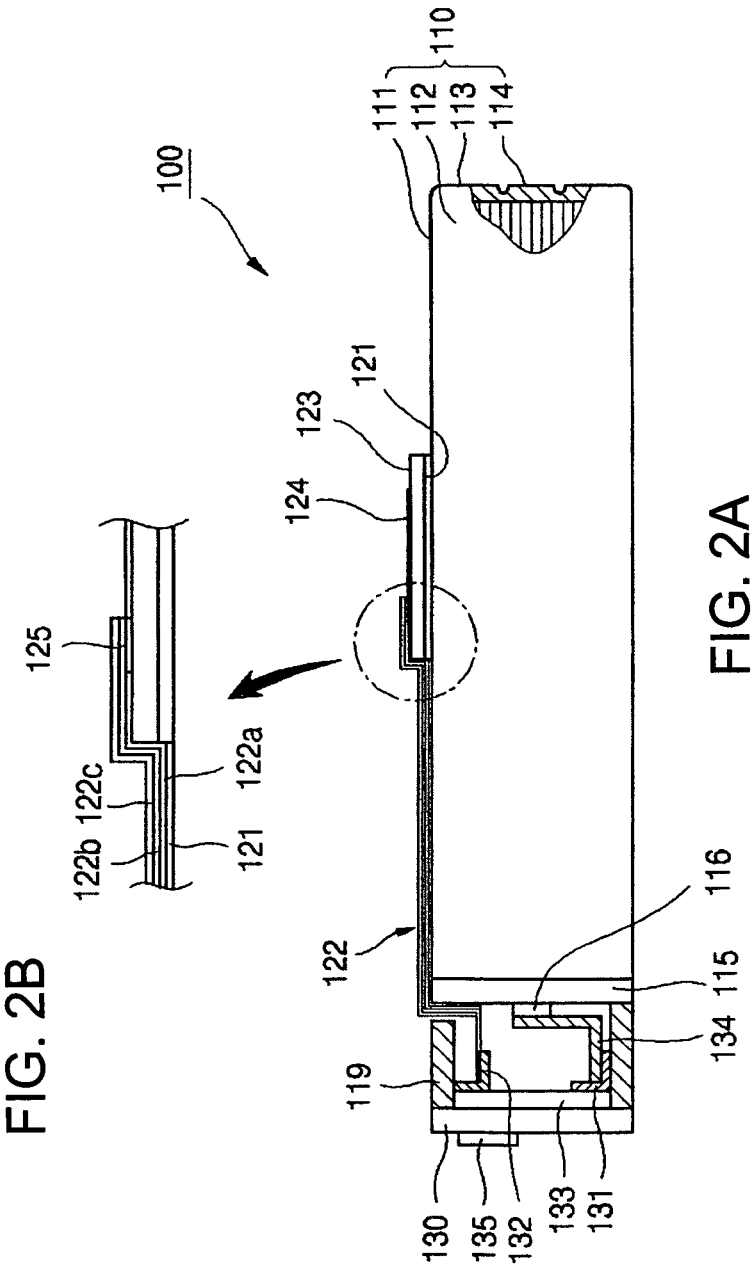

SECONDARY BATTERY INCLUDING PROTECTIVE CIRCUIT MODULE TO PROTECT BATTERY WHEN SWELLING OCCURS

CLAIM OF PRIORITY

This application makes reference to, incorporates the same herein, and claims all benefits accruing under 35 U.S.C. §119 from an application entitled SECONDARY BATTERY, earlier filed in the Korean Intellectual Property Office on 28 Oct. 2004 and there duly assigned Serial No. 2004-0086897.

BACKGROUND OF THE INVENTION

1. Field of the Invention

The present invention relates to a secondary battery, and more particularly to a secondary battery capable of automatically stopping charging or discharging when swelling occurs for improved safety.

2. Description of the Related Art

As generally known in the art, the internal temperature of a secondary battery (for example, a lithium ion secondary battery) tends to rise when the battery is overcharged to approximately 4.5V or more. Such a tendency has been used to develop a safety device for interrupting the overcharging of secondary batteries, and a typical example thereof is a Positive Temperature Coefficient (PTC) thermistor which is serially connected to a large-current path for charging/discharging. The PTC thermistor is a safety device adapted to reduce or completely interrupt the charging/discharging current of a secondary battery by increasing the resistance value as temperature rises.

The PTC thermistor is generally positioned on a surface of a case to be actuated in direct response to the temperature of the case. An end of the PTC thermistor is welded to the case via a lead and the other end thereof is electrically connected to a protective circuit module via another lead.

When the internal temperature of the secondary battery rises due to overcharging, the electrolyte decomposes and generates gas, and the internal pressure increases. This leads to "swelling" wherein the case of the secondary battery swells outward. Of course, safety measures have been devised against such swelling. For example, the case of the secondary battery can have a safety vent formed on the surface thereof with a smaller thickness, which is adapted to fracture and discharge the internal gas to the exterior when the internal pressure is above a predetermined value or the swelling thickness exceeds an allowable value. Of course, the quality of safety provided by the safety vent is not very good, because the electrolyte is discharged to the exterior. However, such damage is believed to be more tolerable than an explosion or burning of the secondary battery, and this is why the safety vent is currently used.

The swelling is caused by various factors. For example, it results from over-discharging, an internal short circuit, an external short circuit, and external heat, in addition to the above-mentioned overcharging. As recent secondary batteries have a thinner case for improved capacity, the swelling tends to occur more frequently.

However, conventional PTC thermistors are actuated only in response to temperature, and not to the above-mentioned swelling, and have many problems as follows:

Firstly, conventional PTC thermistors must have different resistance values according to the capacity of each battery. For example, when a conventional PTC thermistor is used for a battery having a small capacity, it must be cut off at a low current value and must have a large resistance value. Alternatively, when a conventional PTC thermistor is used for a battery having a large capacity, it must be cut off at a high current value and must have a small resistance value. Considering that batteries having various capacities are manufactured, it is not easy to set the resistance value of PTC thermistors according to the capacity of respective batteries.

Secondly, conventional PTC thermistors have a difficulty in quickly suppressing the swelling caused by abruptly rising internal temperature of batteries for structural reasons. For example, the internal temperature of a battery can abruptly rise in an unexpected manner due to overcharging or an external short circuit. Of course, such an abrupt rise in temperature decomposes the electrolyte of the battery, generates a large amount of gas, and causes the swelling to proceed very rapidly. Although a conventional PTC thermistor would be actuated by such an abrupt rise in temperature, the degree of swelling can have exceeded an allowable value. In that case, the safety vent of the case of the battery is actuated and the internal electrolyte leaks, in spite of the actuation of the PTC thermistor, or the case can even explode or burn.

Thirdly, all batteries generally have a predetermined allowable swelling thickness and, when they swell beyond the predetermined thickness, the safety vent is normally actuated or the case explodes and burns. However, conventional PTC thermistors have a resistance value related only to temperature and, even when the batteries swell beyond the allowable thickness, are not actuated but still allow charging/discharging currents to flow as long as the temperature is below an allowable value. As such, conventional PTC thermistors cannot effectively suppress excessive swelling when the temperature is below an allowable level.

Fourthly, conventional PTC thermistors are connected to a conductive case via a lead. However, the lead and the case are not easily welded to each other. As a dangerous process of welding the lead to the case is added, defects are more likely to happen. In addition, a conductive plate of different material must be welded to the case beforehand according to the prior art, in order to improve the welding between the lead and the case. This degrades workability.

Fifthly, conventional PTC thermistors are serially connected to a large-current path for charging/discharging. Therefore, the PTC thermistors themselves consume, for example, discharging currents and shorten the overall battery capacity and service time.

SUMMARY OF THE INVENTION

Accordingly, the present invention has been made to solve the above-mentioned problems occurring in the prior art, and an object of the present invention is to provide a secondary battery having a safety device which can be used for batteries of various capacities.

Another object of the present invention is to provide a secondary battery capable of suppressing an abrupt temperature rise and a rapid swelling following it.

Another object of the present invention is to provide a secondary battery capable of preventing a swelling thickness from exceeding an allowable value even when temperature is below an allowable level.

Another object of the present invention is to provide a secondary battery making it unnecessary to weld a safety device to a case.

Another object of the present invention is to provide a secondary battery having a safety device positioned away from a large-current path for charging/discharging for improved capacity and service time.

In order to accomplish this object, there is provided a secondary battery including a case having positive and negative electrodes and capable of charging and discharging and a safety device which is attached to a surface of the case and the resistance value of which changes during swelling of the case.

The secondary battery can further include a protective circuit module mounted on a side of the case, the protective circuit module being electrically connected to the safety device and adapted to reduce charging/discharging currents as the resistance value of the safety device changes.

The case can include a first region and a second region having an area smaller than that of the first region.

The safety device can be attached to the first region.

The safety device can be attached to the second region.

The safety device can be attached to the first region at the center thereof.

The safety device can be attached to the second region at the center thereof.

The safety device can be attached to the first region at the intersecting point of the diagonal lines thereof.

The safety device can be attached to the first region near the corner thereof.

The safety device can be attached to the second region at the intersecting point of the diagonal lines thereof.

The safety device can be attached to a surface of the case using one of an adhesive, a double-faced adhesive tape, and a double-faced adhesive film.

The safety device can include an insulation film attached to a surface of the case, a metal wire formed on a surface of the insulation film, and a lead terminal connected to both ends of the metal wire.

The safety device can include an insulation film attached to a surface of the case, a metal foil formed on a surface of the insulation film, and a lead terminal connected to both ends of the metal foil.

The safety device can include an insulation film attached to a surface of the case, a semiconductor strip formed on a surface of the insulation film, and a lead terminal connected to both ends of the semiconductor strip.

The safety device can be a strain gauge.

The safety device and the protective circuit module can be connected to each other by a flexible wiring pattern.

The flexible wiring pattern can include a first insulation layer attached to a surface of the case, a wiring pattern formed on the first insulation layer, and a second insulation layer for covering the wiring pattern.

The protective circuit module can include at least one conductive terminal for electrical connection to the safety device.

The protective circuit module can include at least one conductive terminal for electrical connection to at least one of the positive and negative electrodes of the case.

The secondary battery can further include an insulation resin ring positioned between the case and the protective circuit module to prevent them from being separated from each other.

The case can have a safety vent formed on a surface thereof with a smaller thickness than that of the case.

According to another aspect of the present invention, there is provided a secondary battery including a case which is made of conductive material, which contains an electrode assembly having a positive electrode, a negative electrode, and a separator interposed between the positive and negative electrodes therein together with an electrolyte, and the top opening of which is sealed by a cap plate; a safety device which is attached to a surface of the case and the resistance value of which changes when the case swells; and a protective circuit module mounted on a side of the case while being electrically connected to the safety device and adapted to reduce charging/discharging currents as the resistance value of the safety device changes.

According to still another aspect of the present invention, there is provided a secondary battery including an external terminal connected to an external charger or load; a bare cell for performing the function of accumulating energy or releasing stored energy in a charging or discharging mode; a charging/discharging FET device connected to a large-current path between the external terminal and the bare cell; a resistance sensor for sensing the current of the bare cell; a safety device attached to a surface of the bare cell to sense the swelling status of the bare cell; and a protective circuit for controlling the charging/discharging FET device using values sensed from the bare cell, the resistance sensor, and the safety device.

The present invention provides a secondary battery having a safety device which can be used for various battery capacities without modifying specification. Specifically, the same safety device can be used for secondary batteries having different capacities, because the swelling phenomenon occurs in the same pattern regardless of the battery capacity. Therefore, it is unnecessary to manufacture safety devices of secondary batteries according to various standards. This reduces manufacturing cost. The inventive safety device is actuated in direct response to swelling, regardless of temperature. This further improves the safety of the secondary battery.

According to the present invention, it is also possible to efficiently prevent abrupt rise of internal temperature and a resulting rapid swelling phenomenon. The inventive safety device directly senses a swelling phenomenon, not temperature, and reduces or interrupts charging/discharging currents. Therefore, any rapid swelling phenomenon and resulting abrupt rise of temperature can be stopped immediately.

The present invention can prevent swelling from exceeding an allowable thickness, even when temperature is below an allowable level. Since the inventive safety device responds to the swelling thickness, not to temperature, as mentioned above, it reduces or interrupts charging or discharging currents when the swelling thickness is above an allowable value regardless of temperature. This further improves the safety of the secondary battery.

According to the present invention, the safety device is attached to a surface of the case using an adhesive and is electrically connected to the protective circuit module using a flexible wiring pattern in a simple manner. Therefore, conventional processes for welding a conductive plate to a surface of the case and welding a separate lead to the conductive plate are unnecessary. This simplifies the manufacturing process of secondary batteries and reduces manufacturing cost accordingly.

The inventive safety device is excluded from the large-current path and consumes no power. This increases the capacity and service time of the secondary battery.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein:

FIG. 2A is a sectional view taken along line 1-1 of FIG. 1 and FIG. 2B is an expanded view of a portion of FIG. 2A;

DETAILED DESCRIPTION OF THE INVENTION

Figure 1:
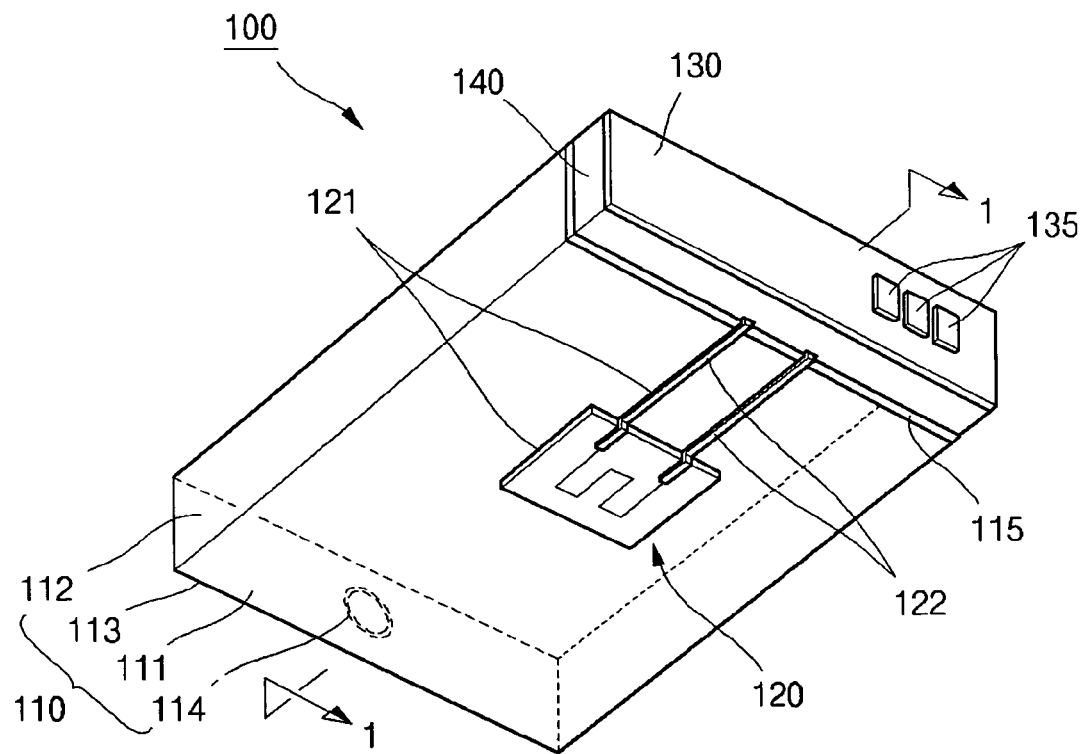
FIG. 1 is a perspective view of a secondary battery according to an embodiment of the present invention.

Hereinafter, exemplary embodiments of the present invention are described with reference to the accompanying drawings. In the following description and drawings, the same reference numerals are used to designate the same or similar components, and repetition of the description of the same or similar components has been omitted.

FIG. 1 is a perspective view of a secondary battery according to an embodiment of the present invention and FIG. 2A is a sectional view taken along line 1-1 of FIG. 1 and FIG. 2B is an expanded view of a portion of FIG. 2A.

Figure 3A:
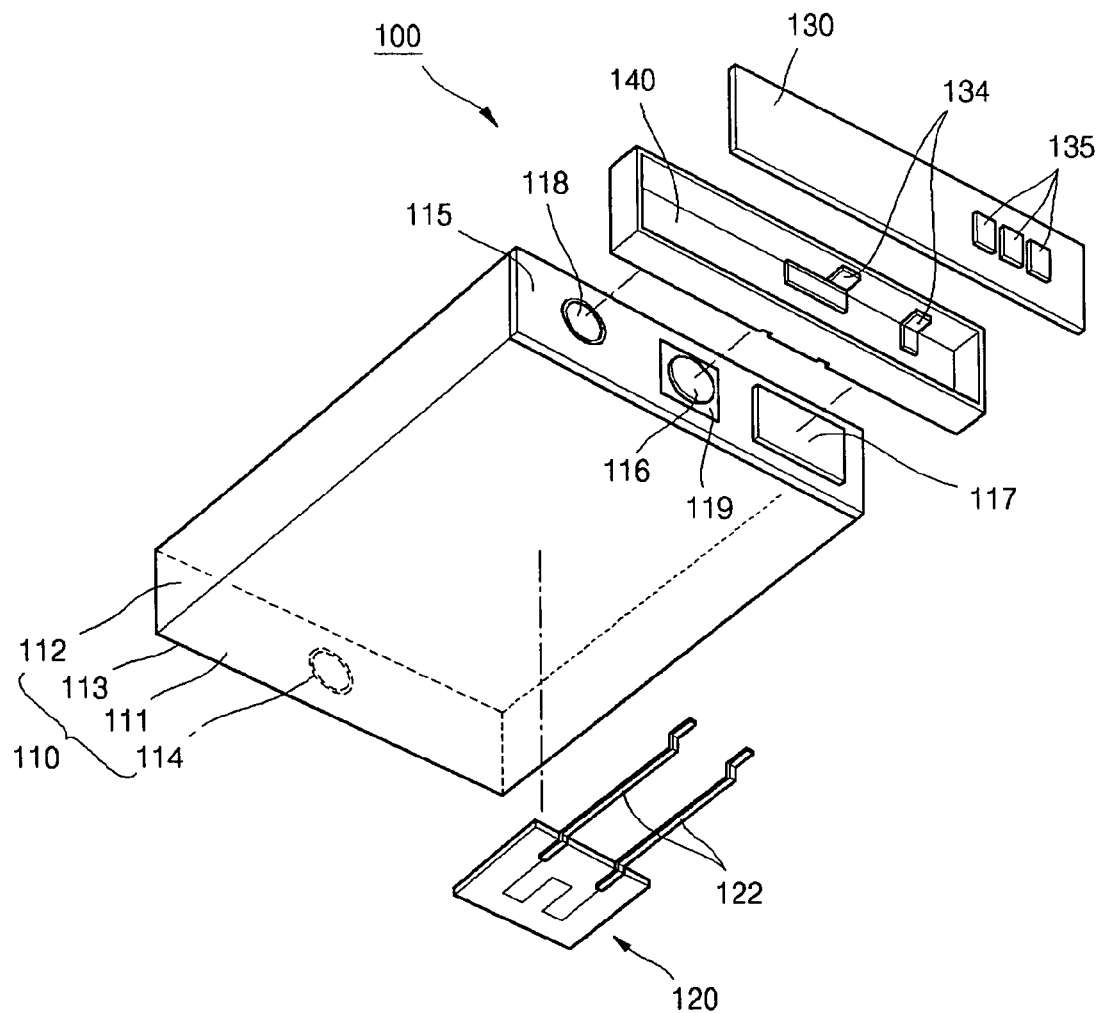
FIG. 3A is an exploded perspective view of the secondary battery of FIG. 1.
Figure 3B:
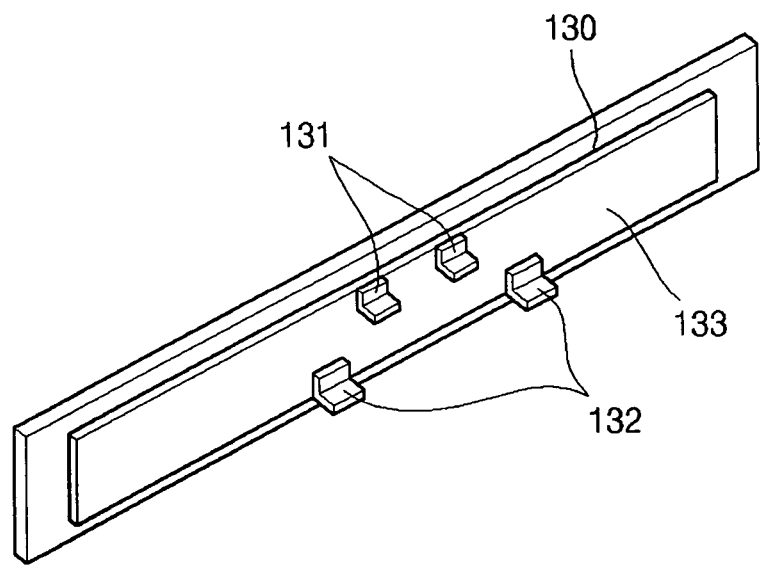
FIG. 3B is a perspective view of a protective circuit module from behind.

FIG. 3A is an exploded perspective view of the secondary battery of FIG. 1 and FIG. 3B is a perspective view of a protective circuit module from behind.

As shown in FIGS. 1-3B, a secondary battery 100 according to an embodiment of the present invention includes a case 110 having positive and negative-electrodes, a safety device 120 attached to a surface of the case 110 and having a resistance value which changes (increases or decreases) during swelling, and a protective circuit module 130 positioned on one side of the case 110 and electrically connected to the safety device 120.

The case 110 has positive and negative electrodes and plays the role of accumulating energy during charging or discharging or releasing stored energy. The case 110 has first regions 111, which are parallel to each other, and which are approximately planar or have a predetermined curvature. The case 110 has second regions 112 which have an area smaller than that of the first regions 111 and which are positioned along the periphery of the first regions 111 while being parallel to each other. The second regions 111 are also approximately planar or have a predetermined curvature. The case 110 has a third region 113 positioned perpendicularly to the first and second regions 111 and 112 and covering the lower portion of the first and second regions 111 and 112. The third region 113 is approximately planar or has a predetermined curvature. The third region 113 has a safety vent 114 formed thereon with a smaller thickness, which is adapted to fracture during excessive swelling to release internal gas.

The first, second and third regions 111, 112 and 113 of the case 110 can be integrally formed. For example, a thin metal plate can be placed into a mold and be subject to deep drawing to obtain first, second, and third regions 111, 112, and 113 as a single unit. Of course, the first, second, and third regions 111, 112, and 113 of the case 110 can be separately formed and welded to one another by laser welding. Although not shown in the drawings, the case 110 can be an aluminum pouch. However, the specific type of case 110 is not limited thereto.

A cap plate 115 is positioned in a direction opposite to the third region 113 and approximately perpendicular to the first and second regions 111 and 112. The cap plate 115 can be welded to the first and second regions 111 and 112 in a direction approximately perpendicular thereto by laser welding, for example. The cap plate 115 an be approximately planar or have a predetermined curvature. The cap plate 115 has an electrode terminal 116 formed approximately at the center thereof, as well as a conductive plate 117 and a safety vent 118 formed on opposite sides of the electrode terminal 116. An insulation gasket 119 is positioned on the outer peripheral edge of the electrode terminal 116 to prevent a short circuit between the cap plate 115 and the electrode terminal 116. For example, the electrode terminal 116 acts as a negative electrode, and the cap plate 115 and the whole case 110 acts as a positive electrode, except for the electrode terminal 116. Of course, the electrode terminal 116 can act as a positive electrode, and the cap plate 115 and the whole case 110 can act as a negative electrode, except for the electrode terminal 116. The safety vent 118 has a thickness smaller than that of the cap plate 115 and is adapted to fracture during excessive swelling of the case 110 to release internal gas to the exterior. Of course, the safety vent 118 can be omitted since the case 110 has the safety vent 114 formed on the third region 113.

The conductive plate 117 provides a good electrical connection to the protective circuit module 130. The conductive plate 117 can be made of a metal, such as nickel, for excellent welding property. However, the material is not limited thereto in the present invention. The case 110 and the cap plate 115 can be made of any material chosen from aluminum (Al), steel, stainless steel (SUS), and an equivalent thereof. However, the material is not limited thereto.

The safety device 120 can be attached to the first region 111 of the case 110, which is most prone to swelling. For example, the safety device 120 can be attached to the first region 111 of the case 110 at the center thereof, at the intersecting point of the diagonal lines thereof, or near the corner thereof. However, the gluing position is not limited thereto in the present invention. The safety device 120 can be attached to one of the first regions 111 or to both first regions 111. Although only one safety device 120 is shown in the drawings, a number of safety devices 120 can be attached to the surface of the case 110, and the number thereof is not limited herein.

The safety device 120 can be configured in such a manner that its resistance value increases or decreases in proportion to the swelling of the case 110. For example, the safety device 120 can be adapted to have substantially no resistance value when there is no swelling of the case 110, to have a small resistance value when the swelling is small, and to have a large resistance value when the swelling is large, and vice versa. The safety device 120 can also be adapted to pass a current as is when there is no swelling of the case 110, to pass a relatively small amount of current when the swelling is small, and to pass no current when the swelling is above a specific value. That is, the safety device 120 has different output values according to the amount of swelling of the case 110.

The safety device 120 can be attached to a surface of the case 110 using an adhesive 121 chosen from a conventional tenacity adhesive, a double-faced adhesion tape, and a double-faced adhesion film. However, the specific type of adhesive is not limited thereto. The more uniform and stronger the adhesion force between the safety device 120 and the case 110 is, the better, because the safety device 120 must sensitively respond to the swelling of the case 110.

The safety device 120 can be electrically connected to the protective circuit module 130 via a flexible wiring pattern 122. The flexible wiring pattern 122 is more stable than a conventional lead connection, because it bends easily and is not electrically conductive with respect to the case 110. The safety device 120 is not connected to a large-current path for charging/discharging positioned on the protective circuit module 130. Therefore, the safety device 120 does not consume a charging/discharging current.

As shown in the drawings, the flexible wiring pattern 122 can include a first insulation layer 122a attached to a surface of the case 110 with an adhesive 121, a wiring pattern 122b formed on the first insulation layer 122a with one end electrically connected to the safety device 120 and the other end electrically connected to the protective circuit module 130, and a second insulation layer 122c for covering the wiring pattern 122b and protecting it from the external environment.

The protective circuit module 130 is mechanically connected to a side of the case 110 and is electrically connected to the safety device 120. Specifically, the protective circuit module 130 is positioned on a side of the cap plate 115 and has at least one conductive terminal 131 protruding toward the cap plate 115 for electrical connection to the safety device 120. The protective circuit module 130 has an electronic component 133 mounted thereon for controlling charging and discharging operations, and the conductive terminal 131 is electrically connected to the electronic component 133. More specifically, the conductive terminal 131 can be electrically connected to the wiring pattern 122b of the flexible wiring pattern 122. Of course, the conductive terminal 131 does not have a large-current path either. If it is difficult to electrically connect the conductive terminal 131 directly to the wiring pattern 122b of the flexible wiring pattern 122, an intermediate conductive lead (not shown) can be positioned between the conductive terminal 131 and the flexible wiring pattern 122.

The protective circuit module 130 can be provided with another conductive terminal 132 for electrical connection to the cap plate 115 and the electrode terminal 116, which constitute a large-current path for charging/discharging. If it is difficult to electrically connect the conductive terminal 132 directly to the cap plate 115 or the electrode terminal 116, another intermediate conductive lead 134 can be additionally positioned as shown in the drawing. Of course, one of the conductive leads 134 is welded to the electrode terminal 116 positioned on the cap plate 115 and the other is welded to the conductive plate 117 as mentioned above.

The protective circuit module 130 can have a number of external terminals 135 positioned on a surface which is opposite to the cap plate 115, for direct electrical connection to an external apparatus (a charger or load). However, the configuration of the protective circuit module 130, as has been mentioned so far, is only an example. The arrangement of the conductive terminal 131 to which the flexible wiring pattern 122 is connected, another conductive terminal 132 welded to the electrode terminal 116 and the cap plate 115, and the electronic component 133, as well as the number and type of the external terminals 135, can be easily modified and are not limited to the specific manner discussed herein.

An insulation resin ring 140 of an approximately rectangular shape can be positioned between the cap plate 115 and the protective circuit module 130 to prevent the protective circuit module 130 from escaping from the cap plate 115 to the exterior. The insulation resin ring 140 also prevents alien substances from penetrating into the gap between the cap plate 115 and the protective circuit module 130. Instead of using the insulation resin ring 140, a resin can be directly molded between the protective circuit module 130 and the cap plate 115 to mechanically attach them together. Alternatively, the insulation resin ring 140 and the resin can be omitted. In some cases, the protective circuit module 130, the cap plate 115, and the case 110 can be integrally molded by a resin, except for the external terminals 135.

Figure 4A:
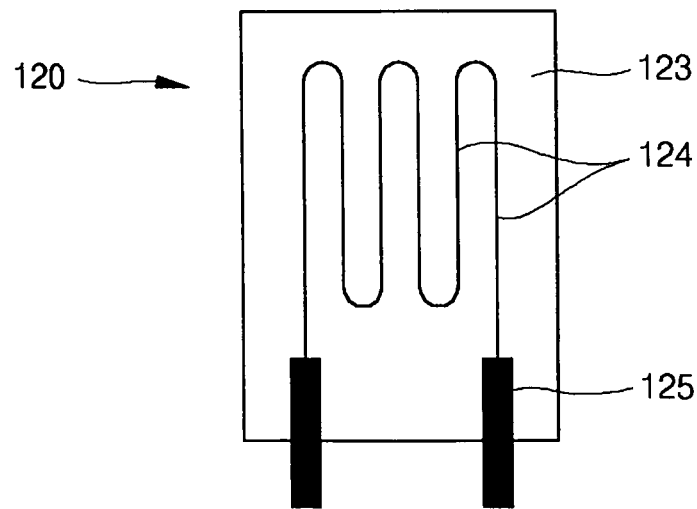
FIGS. 4A to 4C are top views of examples of safety devices of a secondary battery according to an embodiment of the present invention.
Figure 4B:
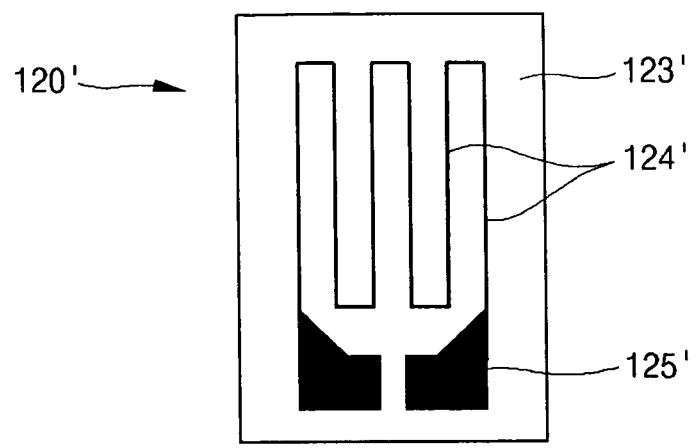
Figure 4C:
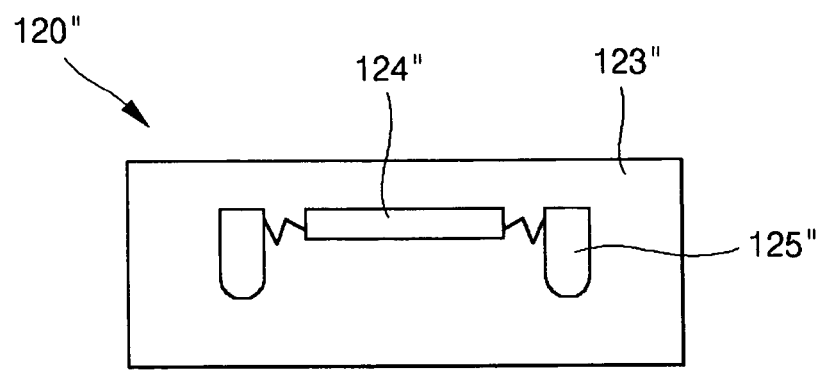

FIGS. 4A to 4C are top views of various examples of safety devices used in a secondary battery according to various embodiments of the present invention.

Safety devices 120, 120', and 120", as shown in the drawings, are connected to a small-current path, and not to a large-current path for charging/discharging. In other words, although they are attached to the case 110 of the secondary battery 100, they are connected to a small-current path (which is used to actuate a protective circuit, but not used as a charging/discharging path) in the protective circuit module 130.

As shown in FIG. 4A, the safety device 120 includes an insulation film 123 attached to a surface of the case 110. A metal wire 124 is positioned on the insulation film 123 and is provided with lead terminals 125 on both ends thereof. The lead terminals 125 are connected to the wiring pattern 122b of the flexible wiring pattern 122.

As shown in FIG. 4B, another safety device 120' includes an insulation film 123' attached to a surface of the case 110. A metal-foil 124' is positioned on the insulation film 123' and is provided with lead terminals 125' on both ends thereof. As mentioned above, the lead terminals 125' are electrically connected to the wiring pattern 122b of the flexible wiring pattern 122.

As shown in FIG. 4C, another safety device 120" includes an insulation film 123" attached to a surface of the case 110. An n-type or p-type semiconductor strip 124" is positioned on the insulation film 123" and is provided with lead terminals 125" on both ends thereof. The lead terminals 125" are electrically connected to the wiring pattern 122b of the flexible wiring pattern 122, as mentioned above.

A safety device used in the present invention can be a strain gauge which is used to measure so-called surface deformation (swelling of the case). However, the specific type is not limited in the present invention. Any element can be used as a safety device as long as it can sense or measure surface deformation. The amount of deformation is the ratio of original length to changed length, and the change in length of the case 110, to which a safety device is fastened, is sensed by the change in resistance of the metal wire 124, the metal foil 124', or the semiconductor strip 124" positioned on the insulation film 123. Specifically, the resistance value of the metal wire 124, the metal foil 124', or the semiconductor strip 124" increases or decreases as the case 110 swells. When informed of such increase or decrease, the protective circuit module 130 reduces or interrupts the large current for charging/discharging.

For example, the safety device 120 is characterized in that its resistance value changes (increases) as the surface of the case 110 deforms, i.e., swells, and the ratio of resistance change (ΔR) to the whole resistance (R) is proportional to the amount of deformation (ϵ). These characteristics can be expressed in an equation: ΔR/R=Gϵ, wherein G is a gauge constant and can have a value in the order of 1-1000. For example, if the original resistance value of the safety device 120 is 10Ω, the gauge constant is 100, and the amount of deformation or swelling is 0.1, the resistance change is 100× 0.1×10=100Ω. This means that, when there is no swelling, the resistance value of the safety device 120 is 110Ω, but if swelling occurs with a value of 0.1, the resistance value of the safety device 120 increases to 100Ω. Since current is inversely proportional resistance, the amount of current flowing through the safety device 120 is reduced by approximately ten times. Of course, the original resistance value, gauge constant, and swelling value of the safety device 120 are just given as an example, and can be modified as desired by adjusting corresponding parameters when designing the device. However, the original resistance value of the safety device 120 is preferably set to be as small as possible when designing the secondary battery 100, because the larger the value is, the more current are consumed by the protective circuit module 130. In addition, the gauge constant value is preferably set to be as large as possible, because the resistance value must increase in response to the swelling of the case 110 so that the current can be interrupted in an abrupt swelling state.

Figure 5:
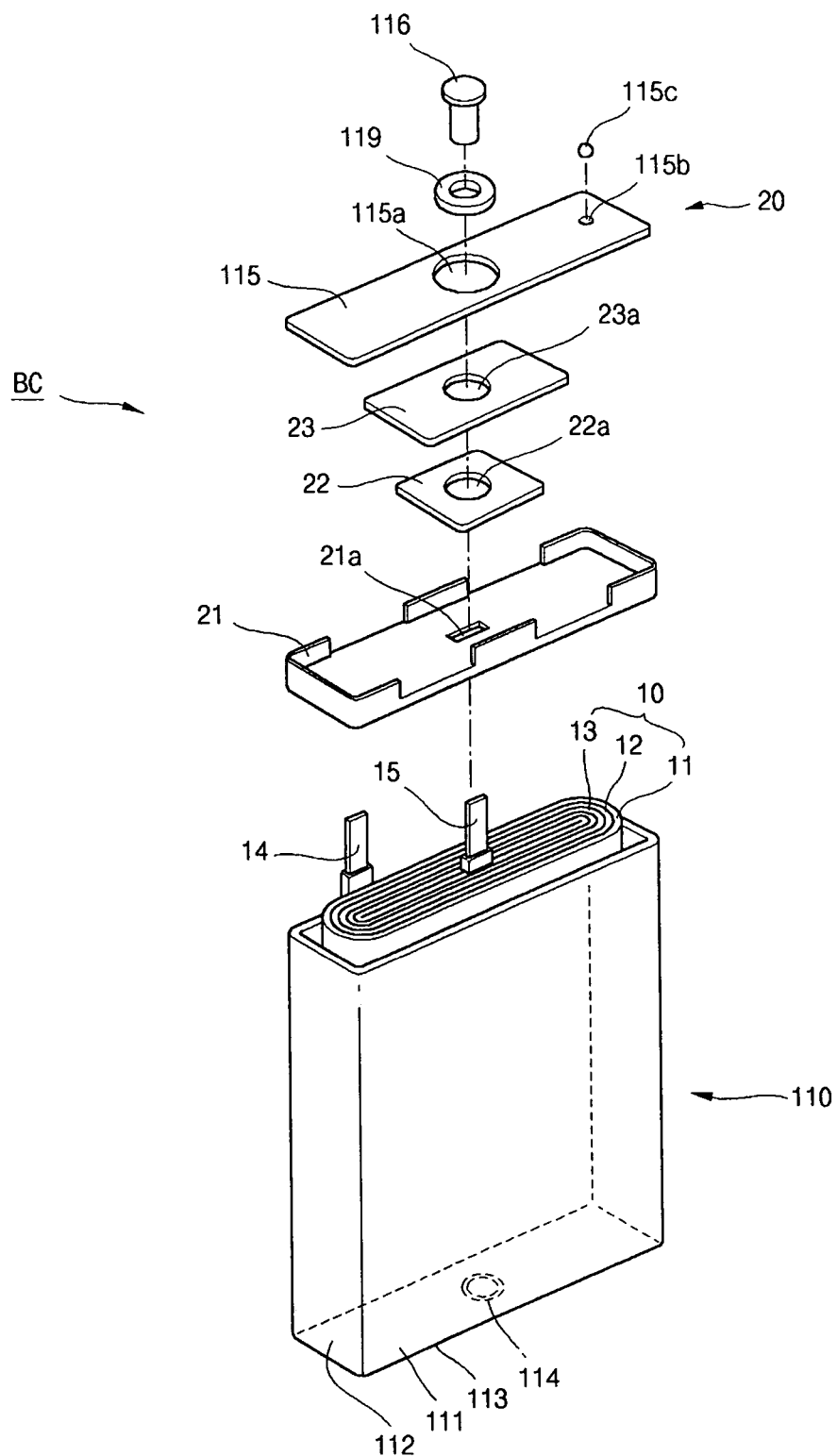
FIG. 5 is an exploded perspective view of only a bare cell of a secondary battery according to an embodiment of the present invention.

FIG. 5 is an exploded perspective view of only a bare cell of a secondary battery according to an embodiment of the present invention. In general, a bare cell BC of a secondary battery 100 is equipped with no protective circuit module 130 and the like. As such, no protective circuit module 130 and no safety device 120 are shown in the drawing. In addition, the configuration of the bare cell BC as described herein is only an example given to help the overall understanding of the secondary battery 100 according to the present invention, and is not limited in the present invention. Therefore, the safety device 120 adopted in the present invention can be attached not only to the bare cell BC as shown in the drawing, but also to various types of other bare cells BC not shown in the drawing.

As shown in the drawing, the bare cell BC includes an electrode assembly 10 adapted to be charged with a predetermined amount of energy or to discharge it, a case 110 for containing the electrode assembly 10 therein, a cap assembly 20 attached to the top of the case 110 to prevent the electrode assembly 10 from escaping, and an electrolyte (not shown) injected into the case 110 to enable ion movement within the electrode assembly 10.

The electrode assembly 10 can include a positive electrode plate 11 having positive electrode active materials (for example, lithium cobalt oxide (LiCoO$_2$), lithium nickel oxide (LiNiO$_2$), lithium manganese oxide (LiMn$_2$O$_4$), or an equivalent thereof) attached thereto, a negative electrode plate 13 having negative electrode active materials (for example, graphite or an equivalent thereof) attached thereto, and a separator 12 positioned between the positive and negative electrode plates 11 and 13 to prevent a short circuit and to allow only the movement of lithium ions. The positive and negative electrode plates 11 and 13 can be wound into an approximately jelly roll, together with the separator 12 interposed between them, and contained in the case 110. The positive electrode plate 11 can be composed of aluminum (Al) foil, the negative electrode plate 13 of copper (Cu) foil, and the separator 12 of polyethylene (PE) or polypropylene (PP). However, the materials are not limited thereto in the present invention. Positive and negative electrode leads 14 and 15 are respectively welded to the top of the positive and negative electrode plates 11 and 13, and protrude therefrom. The positive and negative electrode plates 14 and 15 can be respectively of aluminum (Al) and nickel (Ni). However, the materials are not limited thereto in the present invention.

The case 110, as has already been described in detail, has first regions 111 which are positioned opposite to each other, second regions 112 which have an area smaller than that of the first regions 111 and which are positioned between the first regions 111 while being opposite to each other, and a third region 113 for covering the first and second regions 111 and 112. The case 110 has an opening 110a facing opposite to the third region 113 while being in communication with the space between the first and second regions 111 and 112.

In addition, an insulation case 21, a terminal plate 22, and an insulation plate 23 are successively attached to the top of the electrode assembly 10, specifically to the top of the case 110. However, these components are not always necessary in the present invention. The insulation case 21, the terminal plate 22, and the insulation plate 23 are respectively provided with through-holes 21a, 22a, and 23a, so that an electrode terminal 116 can extend upward through it.

The cap assembly 20 is assembled into the opening 110a of the case 110. The cap assembly 20 has an approximately plate-shaped cap plate 115, a through-hole 115a formed at the center of the cap plate 115, and an electrolyte injection hole 115a formed on a side thereof for electrolyte injection. The configuration of the cap plate 115, of course, has already been described in detail. An insulation gasket 119 can be attached to the through-hole 115a of the cap plate 115, and the electrode terminal 116 can be attached to the insulation gasket 119. Of course, the electrode terminal 116 can be welded to the negative electrode lead 15 and act as a negative electrode during charging or discharging. The positive electrode lead 14 can be directly welded to the cap plate 115 so that the cap plate 115 and the case 110 can act as a positive electrode. Alternatively, the electrode terminal 116 can be attached to the positive lead 14 and act as a positive electrode, and the cap plate 115 can have the negative electrode 15 welded thereto and act as a negative electrode.

A ball 115c can be attached to the electrolyte injection hole 115b of the cap plate 115, after an electrolyte has been injected, to prevent the electrolyte from leaking to the exterior. The cap plate 115 can have safety vent 118 formed on one side thereof, which is adapted to open during excessive swelling.

Although not shown in the drawing, the electrolyte acts as a medium for carrying lithium ions created from the positive and negative electrodes within the battery through electrical chemical reaction during charging/discharging, and can be a non-aqueous organic electrolyte which is a mixture of a lithium salt and a high-purity organic solution. The electrolyte can also be a polymer using a high-molecular electrolyte.

As mentioned above, the configuration of the bare cell BC is not limited in the present invention. The safety devices 120, 120', 120" of the present invention can be used not only for the bare cell BC configured as above, but also for all kinds of batteries which are prone to swelling.

Figure 6A:
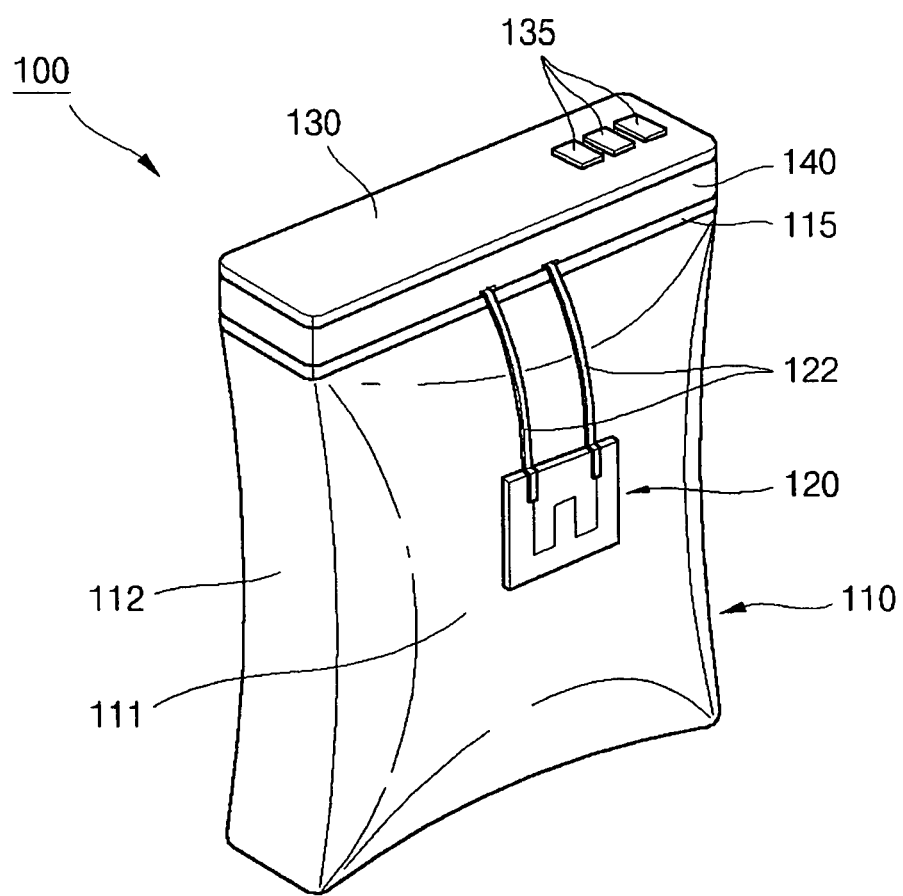
FIG. 6A is a perspective view of a swollen secondary battery according to an embodiment of the present invention.
Figure 6B:
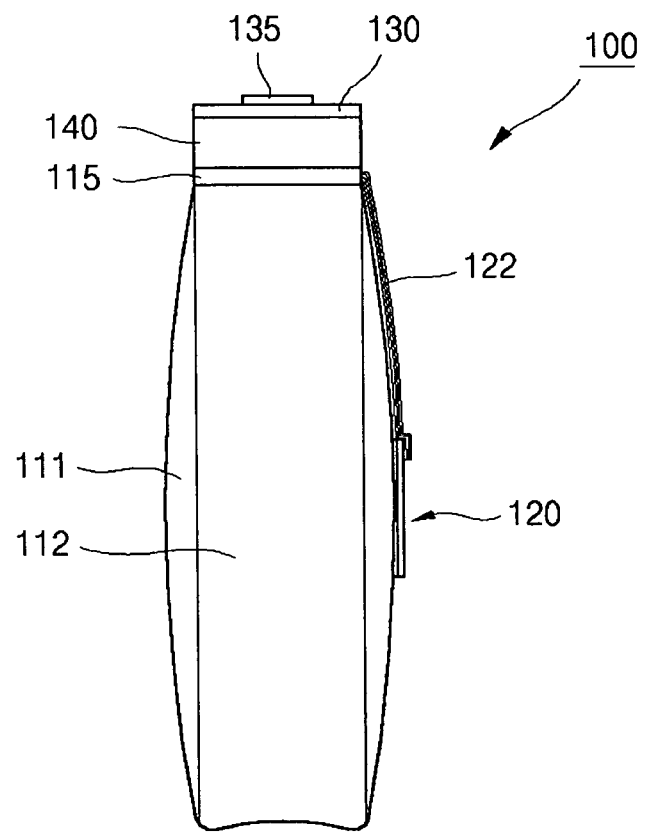
FIG. 6B is a lateral view of the secondary battery of FIG. 6A.

FIG. 6A is a perspective view of a swollen secondary battery according to an embodiment of the present invention and, FIG. 6B is a lateral view of the secondary battery of FIG. 6A.

As shown in FIGS. 6A-6B, swelling generally occurs when the internal electrolyte of a secondary battery 100 decomposes due to overcharging, over-discharging, an external short circuit, an internal short circuit, or external heat and releases gas. During such swelling, larger regions generally swell outward while smaller regions are dented inward. In the first regions which are opposite to each other, approximately central portions swell outward. In the second regions 112 which are opposite to each other, approximately central portions are dented inward to the contrary. In the third region 113, approximately central portion is similarly dented inward. The first regions 111 are most severely prone to a swelling phenomenon, because they are largest, while the second and third regions 112 and 113 are relatively less prone to it. Therefore, a safety device 120 can be attached to the first regions 111, which is most sensitive to swelling, approximately at the center thereof or near the four corners thereof. According to a simulation result on swelling, it has been reported that the change of elongation ratio is largest near the four corners. Accordingly, a safety device 120 is preferably attached near each four corner, not at the center as shown in the drawing. As such, the safety device 120 disclosed in the present invention responds to swelling most sensitively and quickly transmits corresponding information to the protective circuit module 130, which then instantly interrupts the charging/discharging of the secondary battery.

Such swelling can degrade the adhesion force between the surface of the case 110 and the safety device 120. Therefore, the stronger the adhesive 121 for gluing the case 110 and the safety device 120 to each other, the better, as has been already mentioned. In addition, it is preferable to uniformly apply the adhesive 121 between the case 140 and the safety device 120. If the adhesion force of the adhesive 121 is weak, the safety device 120 can be separated from the case 110 even during weak swelling and can not properly sense the swelling of the case 110. If the adhesive 121 is not uniformly applied over the whole region of the safety device 120, the sensitivity of the safety device 120 to swelling can deteriorate.

The swelling occurs in almost the same pattern regardless of the capacity of the secondary battery. In other words, a larger portion swells outward while a smaller portion is dented inward. Accordingly, the safety device disclosed in the present invention does not need to change its specification according to the capacity of the battery. For example, the original resistance and gauge constant do not need to be modified according to the capacity of a battery every time a different battery is manufactured. The safety device is actuated in direct response to swelling, regardless of temperature, and further improves the safety of the secondary battery. Since swelling instantly occurs concurrently with the abrupt rise of internal temperature, the safety device is not adapted to sense the internal temperature, but to sense the resulting swelling phenomenon, and thereby can quickly suppress the abrupt rise of internal temperature or the swelling phenomenon. The swelling can also occur below an allowable temperature, and the safety device of the present invention can also rapidly suppress such swelling as occurring below an allowable temperature. The safety device is not connected to a large-current path for charging/discharging, but to a small-current path for actuating a protective circuit. This substantially reduces the amount of power consumed by the safety device in the secondary battery.

Figure 7:
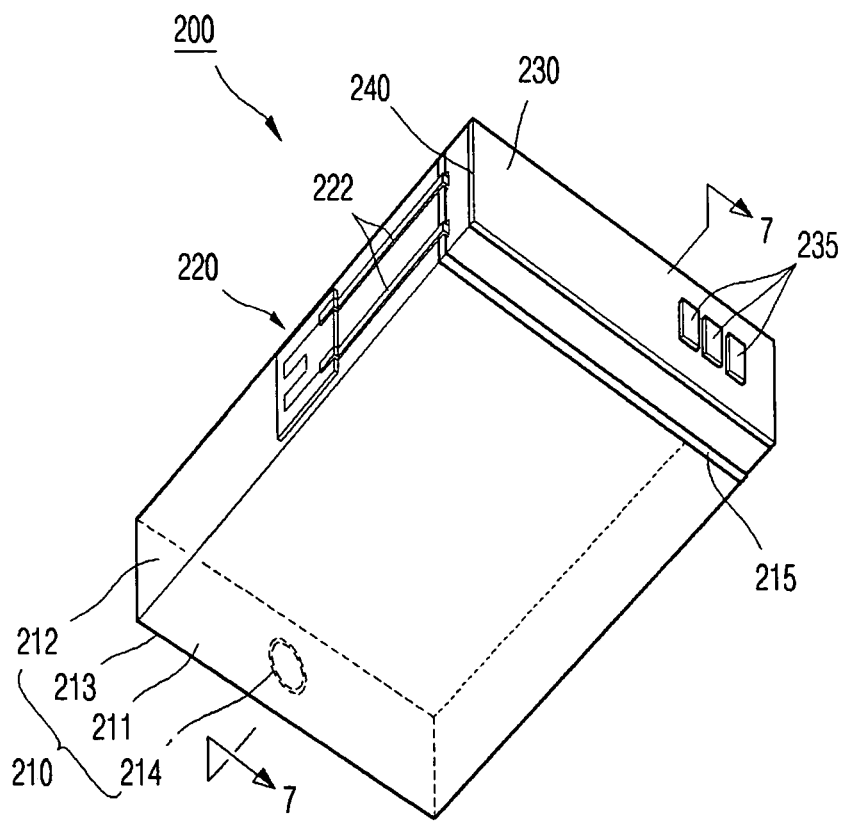
FIG. 7 is a perspective view of a secondary battery according to another embodiment of the present invention.
Figures 8A, 8B:
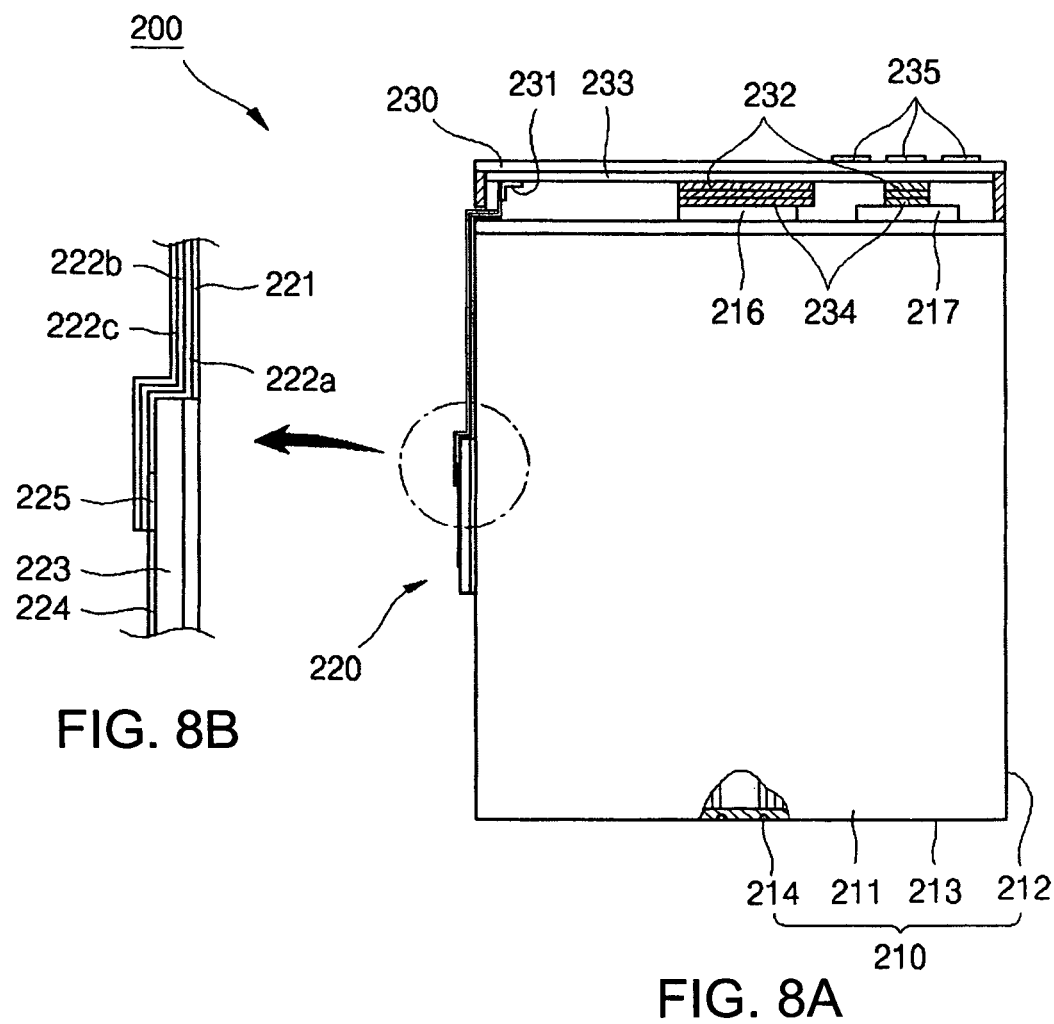
FIG. 8A is a sectional view taken along line 7-7 of FIG. 7
FIG. 8B is an expanded view of a portion of FIG. 8A.

FIG. 7 is a perspective view of a secondary battery according to another embodiment of the present invention and FIG. 8 is a sectional view taken along line 7-7 of FIG. 7 and FIG. 8B is an expanded view of a portion of FIG. 8A.

Figure 9A:
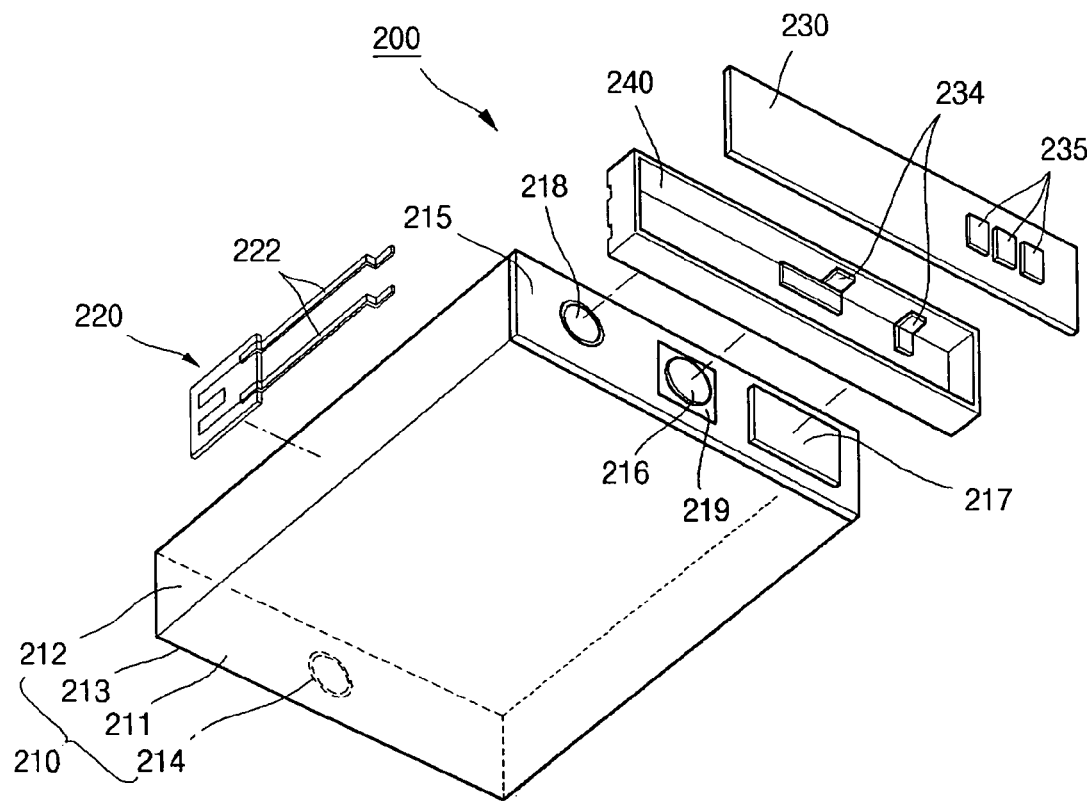
FIG. 9A is an exploded perspective view of the secondary battery of FIG. 7.
Figure 9B:
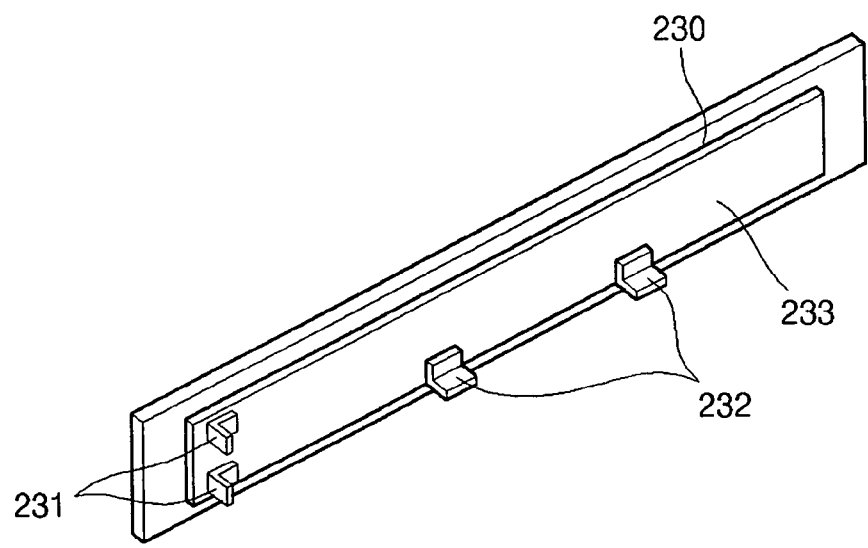
FIG. 9B is a perspective view of a protective circuit module from behind.

FIG. 9A is an exploded perspective view of the secondary battery of FIG. 7 and FIG. 9B is a perspective view of a protective circuit module from behind.

The secondary battery 200 is similar to the above-mentioned secondary battery 100, and the differences between them are mainly described below.

As shown in the FIGS. 7-9B, the secondary battery 100 according to another embodiment of the present invention includes a case 210 having positive and negative electrodes, a safety device 220 which is attached to a surface of the case 210 and the resistance value of which changes during swelling, and a protective circuit module 230 positioned on a side of the case 210 while being electrically connected to the safety device 220.

The case 210 has first regions 211, second regions 212 which have an area smaller than that of the first region 211 and which are positioned along the periphery of the first regions 211, and a third region 213 for covering the first and second regions 211 and 212. The third region 213 has a safety vent 214 formed thereon with a smaller thickness, which is adapted to fracture during excessive swelling to release internal gas.

The case 210 has a cap plate 215 fastened thereto in a direction approximately perpendicular to the first and second regions 211 and 212 and opposite to the third region 213. The cap plate 215 has an electrode terminal 216 formed approximately at the center thereof, as well as a conductive plate 217 and a safety vent 218 formed on opposite sides thereof. An insulation gasket 219 is positioned on the outer peripheral-edge of the electrode terminal 216 to avoid a short circuit between the electrode terminal 216 and the cap plate 215.

The safety device 220 is attached to the second regions 212 of the case 210. For example, the safety device 220 is attached to the second regions 211 of the case 210 at the center thereof or at the intersecting point of the diagonal lines thereof. However, the gluing position is not limited in the present invention. The safety device 220 can be attached to one of the second regions 212 or to both second regions 212. Although only one safety device 220 is shown in the drawings, a number of safety devices 220 can be attached to the surface of the case 210. However, the number of safety devices 220 is not limited thereto in the present invention.

The safety device 220 can be configured in such a manner that its resistance value changes in proportion to the swelling of the case 210. For example, the safety device 220 can be adapted to have substantially no resistance value when there is no swelling of the case 210, to have a small resistance value when the swelling is small, and to have a large resistance value when the swelling is large. In other words, the safety device 220 can be adapted to pass a current as is when there is no swelling of the case 210, to pass relatively small current when the swelling is small, and to pass no current when the swelling is above a specific value.

The safety device 220 can be attached to a surface of the case 210 using an adhesive 221 chosen from a conventional tenacity adhesive, a double-faced adhesion tape, and a double-faced adhesion film. However, the specific type is not limited thereto. The more uniform and stronger the adhesion force between the safety device 220 and the case 210 is, the better, because the safety device 220 must sensitively respond to the swelling of the case 210.

The safety device 220 can be electrically connected to the protective circuit module 230 via a flexible wiring pattern 222. The flexible wiring pattern 222 is more stable than a conventional lead connection, because it bends easily and is not electrically conductive to the case 210. The safety device 220 is connected to a small-current path positioned on the protective circuit module 230. This minimizes the amount of power consumed by the safety device 220. As shown in the drawings, the flexible wiring pattern 222 includes a first insulation layer 222a attached to a surface of the case 210 with an adhesive 221, a wiring pattern 222b formed on the first insulation layer 222a with one end electrically connected to the safety device 220 and the other end electrically connected to the protective circuit module 230, and a second insulation layer 222c for covering the wiring pattern 222b and protecting it from external environments.

The protective circuit module 230 is mechanically connected to a side of the case 210 and is electrically connected to the safety device 220. Specifically, the protective circuit module 230 is positioned on a side of the cap plate 215 and has at least one conductive terminal 231 protruding toward the cap plate 215 for electrical connection to the safety device 220. The protective circuit module 230 has an electronic component 233 mounted thereon for controlling charging and discharging operation, and the conductive terminal 231 is electrically connected to the electronic component 233. More specifically, the conductive terminal 231 is electrically connected to the flexible wiring pattern 222. It is clear, of course, that the conductive terminal 231 is connected to a small-current path. The protective circuit module 230 is provided with another conductive terminal 232 for electrical connection to the cap plate 215 and the electrode terminal 216. At least one conductive lead 234 is provided so that the conductive terminal 232 can be easily bonded to the cap plate 215 and the electrode terminal 216. One of the conductive leads 234 is welded to the electrode terminal 216 positioned on the cap plate 215 and the other is welded to the conductive plate 217 as mentioned above.

The protective circuit module 230 has a number of external terminals 235 positioned on a surface which is opposite to the cap plate 215, for direct electrical connection to an external apparatus. However, the configuration of the protective circuit module 230, as has been mentioned so far, is only an example. The arrangement of the conductive terminal 231 to which the flexible wiring pattern 222 is connected, another conductive terminal 232 welded to the electrode terminal 216 and the cap plate 215, and the electronic component 233, as well as the number and type of the external terminals 235, can be easily modified and are not limited thereto in the present invention.

An insulation resin ring 240 of an approximately rectangular shape can be positioned between the cap plate 215 and the protective circuit module 230 to prevent the protective circuit module 230 from escaping from the cap plate 215 to the exterior. The insulation resin ring 240 also prevents alien substances from penetrating into the gap between the cap plate 215 and the protective circuit module 230.

Figure 10A:
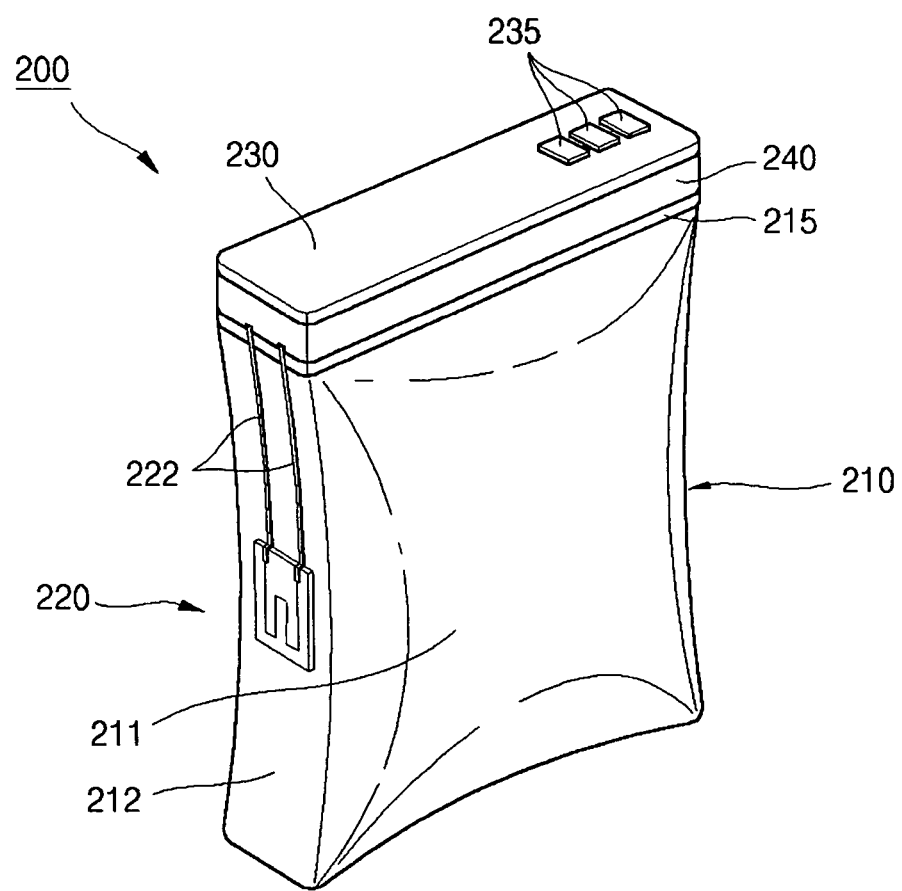
FIG. 10A is a perspective view of a swollen secondary battery according to an embodiment of the present invention.
Figure 10B:
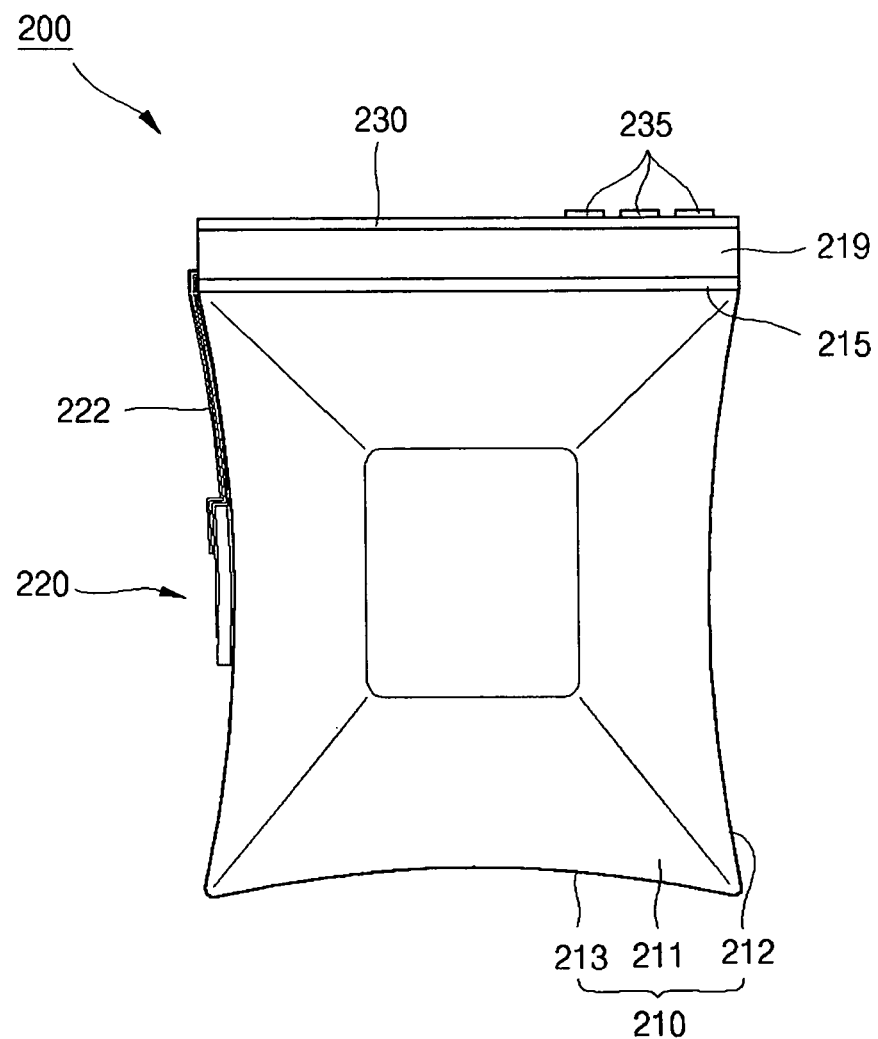
FIG. 10B is a front view of the secondary battery of FIG. 10A.

FIG. 10A is a perspective view of a swollen secondary battery according to an embodiment of the present invention and, FIG. 10B is a front view of the secondary battery FIG. 10A.

As shown in FIGS. 10A-10B, swelling generally occurs when the internal electrolyte of a secondary battery 200 decomposes due to overcharging, over-discharging, an external short circuit, an internal short circuit, or external heat and releases gas. During such swelling, a larger region generally swells outward while a smaller region is dented inward. In the first regions 211 which are opposite to each other, approximately central portions swell outward. In the second regions 212 which are opposite to each other, approximately central portions are dented inward to the contrary. In the third region 213, an approximately central portion is similarly dented inward. The first regions 211 are most severely prone to the swelling phenomenon, because they are largest, while the second and third regions 212 and 213 are relatively less prone to it. Therefore, a safety device 220 can be attached to the first regions 211, which are most sensitive to swelling. In this case, however, the safety device 220 can be too sensitive to swelling and cause the secondary battery to function unstably. In other words, the safety device 220 can reduce large currents too abruptly even during allowable swelling and can interfere with charging/discharging operation. In order to solve this problem, the safety device 220 can be attached to the second regions of the case 210, which are less prone to swelling.

Such swelling can degrade the adhesion force between the surface of the case 210 and the safety device 220. Therefore, the stronger the adhesive 221 for gluing the case 210 and the safety device 220 to each other, the better, as has been already mentioned. In addition, it is preferable to uniformly apply the adhesive 221 between the case 210 and the safety device 220. If the adhesion force of the adhesive 221 is weak, the safety device 220 can be separated from the case 210 even during weak swelling and can not properly sense the swelling of the case 210. If the adhesive 221 is not uniformly applied over the whole region of the safety device 220, the sensitivity of the safety device 220 to swelling can deteriorate.

Figure 11:
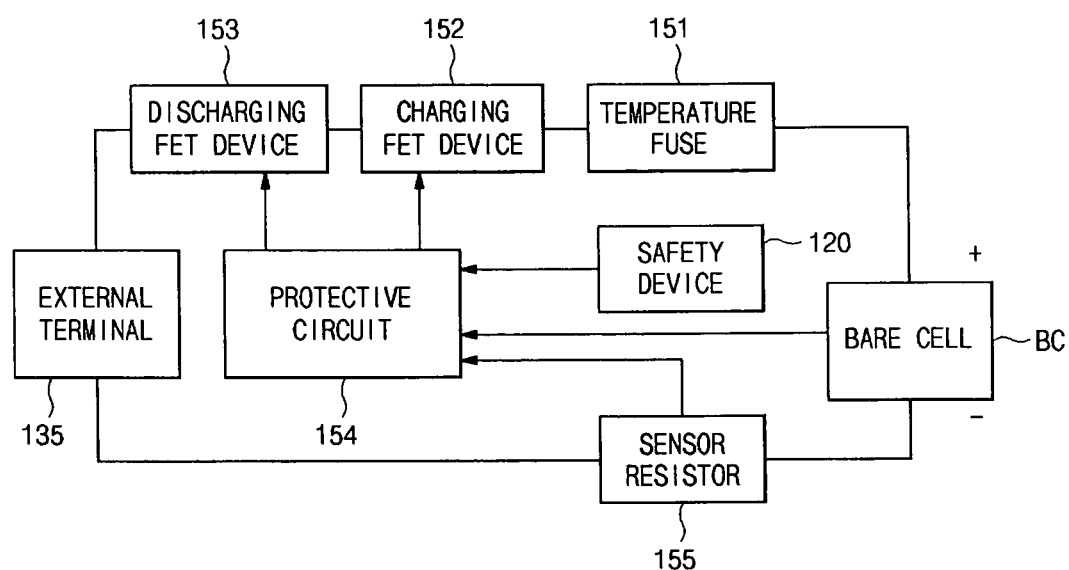
FIG. 11 is a block diagram of a circuit configuration of a secondary battery according to the present invention.

FIG. 11 is a block diagram of a configuration of a secondary battery according to an embodiment of the present invention.

As shown in FIG. 11, the secondary battery according to the present invention includes: a bare cell BC; a temperature fuse 151 connected to an electrode of the bare cell BC; charging and discharging FET devices 152 and 153 serially connected to the temperature fuse 151; a sensor resistor 155 connected to the other electrode of the bare cell BC; a safety device 120 physically fastened to the bare cell BC; a protective circuit 154 for controlling the charging and discharging FET devices 152 and 153 with information on voltage, current, and swelling status inputted from the bare cell BC, the sensor resistor 155, and the safety device 120; and an external terminal 135 positioned between the charging and discharging FET devices 152 and 153 and the sensor resistor 155. The protective circuit 154 receives voltage information directly from the bare cell BC, current information from the sensor resistor 155, and swelling information from the safety device 120.

The temperature fuse 151, the charging and discharging FET devices 152 and 153, the sensor resistor 155, the protective circuit 154, and the external terminal 135 can be positioned on the protective circuit module 130, and the safety device 120 can be attached to a surface of the case 110 which belongs to the bare cell BC, as mentioned above.

The secondary battery according to the present invention, configured as above, is connected to an external charger or load (not shown in the drawing) via the external terminal 135 to perform a charging or discharging operation. The path between the external terminal 135 and the bare cell BC is a large-current path used as a charging/discharging path, through which relatively large currents flow.

When a charger is connected to the external terminal 135 and charging operation of the bare cell BC is performed, the charging path leads from the charger through the external terminal 135, the discharging FET device 153, the charging FET device 152, and the temperature fuse 151 to the bare cell BC. When a load is connected to the external terminal 135 and discharging operation is performed, in contrast, the discharging path leads from the bare cell BC through the temperature fuse 151, the charging FET device 152, the discharging FET device 153, and the external terminal 135 to the load. As such, the safety device 120 is excluded from the large-current path and the amount of power consumed by the charger is reduced accordingly.

The bare cell BC outputs its own charging voltage directly to the protective circuit 154, and the sensor resistor 155 senses the charging current of the bare cell BC and outputs it to the protective circuit 154. If the bare cell BC is in an overcharging state by the voltage or current, the protective circuit 154 turns the charging FET device 152 off so that the flow of charging current in the large-current path is interrupted and the overcharging state is cleared.

The bare cell BC outputs its own discharging voltage directly to the protective circuit 154, and the sensor resistor 155 senses the discharging current of the bare cell BC and outputs it to the protective circuit 154. If the bare cell BC is in an over-discharging state by the voltage or current (or in an external short circuit state), the protective circuit 154 turns the discharging FET device 153 off so that the flow of discharging current in the large-current path is interrupted and the overdischarging state is cleared.

The charging and discharging FET devices 152 and 153, through which large currents flow, have a predetermined resistance component and can overheat during charging/discharging. Such an overheat phenomenon can cause the charging and discharging FET devices 152 and 153 to fail to be normally turned on/off. Specifically, the charging FET device 152 or the discharging FET device 153 can not be turned off even when receiving a turn-off signal from the protective circuit 154. In this case, the large-current path can be interrupted by another means, namely, the temperature fuse 151. The temperature fuse 151 is positioned right above the charging and discharging FET devices 152 and 153 and is adapted to be cut off, when the charging FET device 152 or the discharging FET device 153 overheats, and interrupts the large-current path.

As mentioned above, the bare cell BC can swell not only due to overcharging or over-discharging, but also even when voltage and current during charging or discharging are below an allowable level and the temperature of the charging and discharging FET devices 152 and 153 is also below an allowable level. Of course, the safety vents 114 and 118 formed on the surface of the case 110 are actuated during severe swelling and release internal gas to prevent explosion or burning. However, this cannot be though to be a very safe measure.

Accordingly, an element is needed which interrupts the large-current path in the circuit during excessive swelling, in particular, when swelling occurs due to temperature rise caused by overcharging or over-discharging or when swelling occurs in a normal state (neither overcharge nor over-discharge for some unknown reasons. The safety device 120 is such an element.

As already has been described, the safety device 120 is attached to the bare cell BC, specifically to a surface of the case 110 and senses the swelling status thereof. More particularly, the safety device 120 changes its resistance value of when the bare cell BC swells and outputs the status of change to the protective circuit 154.

When the input value from the safety device 120 is above or below a reference value, the protective circuit 154 turns the charging and discharging FET devices 152 and 153 off to reduce or interrupt a large current. As such, the safety device 120 reduces or interrupts the current in the large-current path before the safety vents 114 and 118 are actuated or burning or an explosion occurs due to excessive swelling. This further improves the safety of the bare cell BC or the secondary battery 100 and 200. Although a single safety device 120 is shown in the block diagram, a number of safety devices 120 can be provided, and the number of safety devices 120 is not limited thereto.

As mentioned above, the present invention provides a secondary battery having a safety device which can be used for various battery capacities without modifying specification. Specifically, the same safety device can be used for secondary batteries having different capacities, because the swelling phenomenon occurs in the same pattern regardless of the battery capacity. Therefore, it is unnecessary to manufacture safety devices of secondary batteries according to various standards. This reduces manufacturing cost. The inventive safety device is actuated in direct response to swelling, regardless of temperature. This further improves the safety of the secondary battery.

According to the present invention, it is also possible to efficiently prevent abrupt rise of internal temperature and a resulting rapid swelling phenomenon. The inventive safety device directly senses a swelling phenomenon, not temperature, and reduces or interrupts charging/discharging currents. Therefore, any rapid swelling phenomenon and resulting abrupt rise of temperature can be stopped immediately.

The present invention can prevent swelling from exceeding an allowable thickness, even when temperature is below an allowable level. Since the inventive safety device responds to the swelling thickness, not to temperature, as mentioned above, it reduces or interrupts charging or discharging currents when the swelling thickness is above an allowable value regardless of temperature. This further improves the safety of the secondary battery.

According to the present invention, the safety device is attached to a surface of the case using an adhesive and is electrically connected to the protective circuit module using a flexible wiring pattern in a simple manner. Therefore, conventional processes for welding a conductive plate to a surface of the case and welding a separate lead to the conductive plate are unnecessary. This simplifies the manufacturing process of secondary batteries and reduces manufacturing cost accordingly.

The inventive safety device is excluded from the large-current path and consumes no power. This increases the capacity and service time of the secondary battery.

Although exemplary embodiments of the present invention have been described for illustrative purposes, those skilled in the art will appreciate that various modifications, additions and substitutions are possible, without departing from the scope and spirit of the present invention as recited in the accompanying claims.

What is claimed is:

1. A secondary battery, comprising:
    a case having positive and negative electrodes adapted to pass charging and discharging currents;
    a safety device attached to a surface of the case and adapted to change its electrical resistance in response to swelling of the case;
    an insulation resin ring is arranged between the case and a protective circuit module, adapted to prevent the case and the protective circuit module from being separated from each other; and
    a flexible wiring pattern adapted to electrically connect the safety device to the protective circuit module, the flexible wiring pattern including:
        a first insulation layer attached to a surface of the case;
        a wiring pattern arranged on the first insulation layer; and
        a second insulation layer adapted to cover the wiring pattern,
    wherein the flexible wiring pattern penetrates the insulation resin ring so as to couple the safety device to the protective circuit module.

2. The secondary battery as claimed in claim 1, further comprising the protective circuit module being attached to a side of the case, the protective circuit module being electrically connected to the safety device and adapted to reduce charging/discharging currents in response to electrical resistance changes of the safety device.

3. The secondary battery as claimed in claim 1, wherein the case comprises a first region and a second region having an area smaller than that of the first region.

4. The secondary battery as claimed in claim 3, wherein the safety device is attached to the first region.

5. The secondary battery as claimed in claim 3, wherein the safety device is attached to the second region.

6. The secondary battery as claimed in claim 3, wherein the safety device is attached to a center of the first region.

7. The secondary battery as claimed in claim 3, wherein the safety device is attached to a center of the second region.

8. The secondary battery as claimed in claim 3, wherein the safety device is attached to an intersection of diagonal lines of the first region.

9. The secondary battery as claimed in claim 3, wherein the safety device is attached near a corner of the first region.

10. The secondary battery as claimed in claim 3, wherein the safety device is attached to an intersection of diagonal lines of the second region.

11. The secondary battery as claimed in claim 1, wherein the safety device is attached to a surface of the case using one of an adhesive, a double-faced adhesive tape, and a double-faced adhesive film.

12. The secondary battery as claimed in claim 1, wherein the safety device comprises:
   an insulation film attached to a surface of the case;
   a metal wire arranged on a surface of the insulation film; and
   lead terminals respectively connected to both ends of the metal wire.

13. The secondary battery as claimed in claim 1, wherein the safety device comprises:
   an insulation film attached to a surface of the case;
   a metal foil arranged on a surface of the insulation film; and
   lead terminals respectively connected to both ends of the metal foil.

14. The secondary battery as claimed in claim 1, wherein the safety device comprises:
   an insulation film attached to a surface of the case;
   a semiconductor strip formed on a surface of the insulation film; and
   lead terminals respectively connected to both ends of the semiconductor strip.

15. The secondary battery as claimed in claim 1, wherein the safety device comprises a strain gauge.

16. The secondary battery as claimed in claim 2, wherein the protective circuit module comprises at least one conductive terminal for electrical connection to the safety device.

17. The secondary battery as claimed in claim 2, wherein the protective circuit module comprises at least one conductive terminal for electrical connection to at least one of the positive and negative electrodes of the case.

18. The secondary battery as claimed in claim 1, wherein the case comprises a safety vent arranged on a surface thereof, the safety vent having a smaller thickness than that of the case.

19. A secondary battery, comprising:
   an external terminal electrically connected to one of an external charger or load;
   a bare cell adapted to respectively accumulate energy or release stored energy in a charging or discharging mode;
   a charging/discharging FET device electrically connected to a large-current path between the external terminal and the bare cell;
   a resistance sensor adapted to sense the current of the bare cell;
   a safety device attached to a surface of the bare cell and adapted to sense swelling of the bare cell;
   a protective circuit module adapted to control the charging/discharging FET device in response to values sensed from the bare cell, the resistance sensor, and the safety device;
   an insulation resin ring is arranged between the bare cell and the protective circuit module, adapted to prevent the bare cell and the protective circuit module from being separated from each other; and
   a flexible wiring pattern adapted to electrically connect the safety device to the protective circuit module, including:
      a first insulation layer attached to a surface of the case;
      a wiring pattern arranged on the first insulation layer;
      a second insulation layer adapted to cover the wiring pattern,
   wherein the flexible wiring pattern penetrates the insulation resin ring so as to couple the safety device to the protective circuit module.

20. The secondary battery as claimed in claim 19, wherein the safety device comprises:
   an insulation film attached to a surface of the bare cell;
   a metal foil arranged on a surface of the insulation film; and
   lead terminals respectively connected to both ends of the metal foil.

21. The secondary battery as claimed in claim 19, wherein the safety device comprises:
   an insulation film attached to a surface of the bare cell;
   semiconductor strip arranged on a surface of the insulation film; and
   lead terminals respectively connected to both ends of the semiconductor strip.

22. The secondary battery as claimed in claim 19, wherein the safety device comprises a strain gauge attached to a surface of the bare cell.

23. The secondary battery as claimed in claim 19, wherein the protective circuit module is adapted to turn the charging/discharging FET device off to interrupt the large-current path in response to the safety device sensing that the bare cell has swollen above a reference value.

24. The secondary battery as claimed in claim 19, wherein the protective circuit module is adapted to turn the charging/discharging FET device off to interrupt the large-current path in response to the safety device sensing that the current of the bare cell is above or below a reference value or when the bare cell senses that its voltage is above or below a reference value.

25. The secondary battery as claimed in claim 23, wherein the protective circuit module is adapted to turn the charging/discharging FET device off to interrupt the large-current path in response to the safety device sensing that the current of the bare cell is above or below a reference value or when the bare cell senses that its voltage is above or below a reference value.

* * * * *